United States Patent
Ziegner

[11] Patent Number: 5,987,876
[45] Date of Patent: Nov. 23, 1999

[54] METHOD OF EXPANDING A FLUE-GAS FLOW IN A TURBINE, AND CORRESPONDING TURBINE

[75] Inventor: Manfred Ziegner, Mülheim an der Ruhr, Germany

[73] Assignee: Siemens Aktiengesellschaft, Munich, Germany

[21] Appl. No.: 09/130,670

[22] Filed: Aug. 7, 1998

Related U.S. Application Data

[63] Continuation of application No. PCT/DE97/00206, Feb. 3, 1997.

[30] Foreign Application Priority Data

Feb. 7, 1996 [DE] Germany ............................ 196 04 416

[51] Int. Cl.$^6$ .................................................. F02C 7/12
[52] U.S. Cl. ..................................... 60/39.06; 60/39.75
[58] Field of Search ............................... 60/39.06, 39.07, 60/39.75

[56] References Cited

U.S. PATENT DOCUMENTS

| | | |
|---|---|---|
| 4,197,700 | 4/1980 | Jahnig . |
| 4,767,259 | 8/1988 | Kurosawa et al. ...................... 60/39.75 |
| 5,003,766 | 4/1991 | Paul ....................................... 60/39.75 |

FOREIGN PATENT DOCUMENTS

| | | |
|---|---|---|
| 3500447 | 8/1986 | Germany . |
| 4330613 | 3/1995 | Germany . |
| 241749 | 8/1946 | Switzerland . |
| 589791 | 7/1977 | Switzerland . |
| 2288640 | 10/1995 | United Kingdom . |

OTHER PUBLICATIONS

International Application WO 91/059046 (Ribesse), dated May 2, 1991.

*Primary Examiner*—Louis J. Casaregola
*Attorney, Agent, or Firm*—Herbert L. Lerner; Laurence A. Greenberg

[57] ABSTRACT

A method of expanding a hot flue-gas flow in a turbine through which a hot flue-gas passes. A structural component of the turbine is cooled by a cooling-gas flow which flows through the structural component and is fed to the hot flue-gas flow. Fuel is added in a metered fashion to the flue-gas flow in the turbine in such a way that a temperature drop in the flue-gas flow, which temperature drop results from the feeding of the cooling-gas flow without a metered addition of the fuel, is largely compensated for by the combustion of the fuel added in a metered fashion to the hot flue-gas flow. A corresponding turbine is also taught.

22 Claims, 4 Drawing Sheets

METHOD OF EXPANDING A FLUE-GAS FLOW IN A TURBINE, AND CORRESPONDING TURBINE

CROSS-REFERENCE TO RELATED APPLICATION

This is a continuation of International Application PCT/DE97/00206, filed on Feb. 3, 1997, which designated the United States.

BACKGROUND OF THE INVENTION

1. Field of the Invention

The invention relates to a method of expanding a hot flue-gas flow in a turbine through which the flue-gas flow passes. In the turbine at least one structural component is cooled by an associated cooling-gas flow, which flows through the structural component and is fed from the latter to the flue-gas flow. A fuel is added in a metered fashion to the flue-gas flow in the turbine for temperature compensating purposed. The invention also relates to a corresponding gas turbine system.

Such a method and such a turbine system are disclosed in Published, Non-Prosecuted German Patent Applications DE 43 30 612 A1 and DE 43 30 613 A1. There are references recited therein pertaining to the field of the invention, which are also of importance in connection to the invention described below. Reference is therefore specifically made to the entire contents of both publications.

The Published, Non-Prosecuted German Patent Application DE 43 30 613 A1 relates to so-called interheating, with the aim of increasing the exhaust-gas temperature of the flue-gas flow in order to make a subsequent steam process more efficient. The principle of reheating consists in increasing the temperature of the combustion air in the combustion chamber and additionally increasing the temperature again at a lower pressure during the expansion phase of the burned combustion air. This ultimately results in a higher outlet temperature of the flue-gas flow after complete expansion to atmospheric pressure. Such reheating is preferably effected up to the maximum temperature permissible in the gas turbine, as a result of which an especially high outlet temperature of the flue-gas flow is achieved.

A gas turbine having a plurality of compressors fluidically connected in series is disclosed in the published British Patent Application GB 2 288 640 A. In that turbine, multiple inter-heating takes place, with the aim of achieving an especially high outlet temperature of the flue-gas. As in the Published, Non-Prosecuted German Patent Application DE 43 30 613 A1, the aim of achieving an increase in the efficiency via a change in the thermodynamic process is thus described. In particular, the multiple reheating is intended to permit a modification of the Joule process and an approximation of the so-called Ericson process. The temperature of the flue-gas flow is preferably increased here to about 1400° C. in each individual gas turbine. Incomplete combustion takes place in a combustion chamber disposed between the gas turbines and the compressors, where all of the fuel is fed to the combustion chamber. An air quantity fed via a respective compressor flow is in each case greater than the air quantity required for the cooling. The published British patent application No. 2 288 640 A therefore pursues the aim of compensating for a temperature loss as a result of the occurring expansion.

A gas turbine whose axial flow duct is divided into two sectional passages through which the moving blades move is described in German Patent DE 35 00 447 C2. The flue gas flows in a combustion-gas sector and cooling air for cooling the moving blades flows in an air sector. A reduced output of the turbine on account of the fact that the hot combustion air is not admitted to the moving blades over the entire cross-section of the flow passage but only in the combustion-gas sector is believed to be rectified by a modification of the gas turbine specified. To this end, combustion chambers disposed axially one behind the other are provided in the combustion-chamber sector. Therefore, the German Patent DE 35 00 447 C2, like the Published, Non-Prosecuted German Patent Application DE 43 30 613 A1, also deals with a form of interheating, which in this case, however, is restricted solely to the combustion-gas sector.

SUMMARY OF THE INVENTION:

It is accordingly an object of the invention to provide a method of expanding a flue-gas flow in a turbine, and a corresponding turbine which overcome the above-mentioned disadvantages of the prior art devices and methods of this general type, in which the disadvantages of the unavoidable cooling-gas processes are compensated for in a simple manner.

With the foregoing and other objects in view there is provided, in accordance with the invention, a gas expansion method, which includes: providing a hot flue-gas flow through a turbine; cooling at least one structural component of the turbine by a cooling-gas flow flowing through the at least one structural component; feeding the cooling-gas flow flowing through the at least one structural component into the hot flue-gas flow resulting in a temperature drop in the hot flue-gas flow; and metering fuel into the hot flue-gas flow in the turbine resulting in a combustion of the fuel in the hot flue-gas flow to compensate for the temperature drop caused by the feeding of the cooling-gas flow into the hot flue-gas flow.

The invention relates in particular to a turbine which works in combination with a compressor, in particular a turbo-compressor, and a combustion device, a combination of compressor, combustion device and actual turbine being designated as a "gas turbine" according to common practice. An essential characteristic of the gas turbine is its mode of operation in an open cycle, that is in a cycle in which the fluidic medium required for the thermodynamic process is taken from the ambience and fed back to the ambience after the process. In general, the compressor takes air from the ambience, compresses it and delivers it in compressed form to the combustion device. A fuel is burned in the compressed air while forming a flue-gas flow, which is then fed to the turbine and is expanded in the turbine down to the normal ambient pressure. A portion of the air provided by the compressor does not pass to the combustion device but is fed, if need be after special cooling, directly to the turbine, where, as a cooling-gas flow, it cools structural components subjected to high thermal loads. In a modern gas turbine, the air from the ambience is compressed from 16 times to 30 times the air pressure in the ambience and heats up in the process to a temperature between 350° C. and 500° C. Further heating to temperatures between 1100° C. and 1400° C. takes place in the combustion device, and the flue-gas flow formed passes at such a temperature into the turbine. When the flue-gas flow leaves the turbine after its expansion, it is at a temperature of around 500° C. at a pressure which corresponds to the normal air pressure in the ambience.

With regard to the method, the object is achieved by a method of expanding a hot flue-gas flow in a turbine through which the flue-gas flow passes. At least one structural component of the turbine is cooled by an associated cooling-gas flow, which flows through the structural component and is fed from the latter to the flue-gas flow. Fuel is added in a metered fashion to the flue-gas flow in the turbine. The fuel being added in a metered fashion in such a way, that a temperature drop in the flue-gas flow, which temperature drop results from the feeding of the cooling gas flow without a metered addition of the fuel, is largely compensated for by combustion of the fuel added in a metered fashion.

In accordance with an added feature of the invention, there is the step of admixing the fuel with the cooling-gas flow before the cooling-gas flow is fed into the hot flue-gas flow.

In accordance with another feature of the invention, there is the step of admixing the fuel with the cooling-gas flow before the cooling-gas flow passes through the at least one structural component.

In accordance with an additional feature of the invention, there is the step of mixing the fuel homogeneously into the cooling-gas flow.

In accordance with a further feature of the invention, there is the step of providing the cooling-gas flow to consist essentially of air and admixing the fuel with the cooling-gas flow in a percentage by weight of at most 2%.

In accordance with a further added feature of the invention, there is the step of cooling the cooling-gas flow before admixing the fuel. In accordance with a further additional feature of the invention, there is the step of providing the at least one structural component of the turbine as a guide wheel, and subjecting the guide wheel directly to the hot flue-gas flow at an inlet of the turbine.

In accordance with yet another feature of the invention, there is the step of providing the guide wheel as a first guide wheel.

In accordance with yet another added feature of the invention, there is the step of providing the turbine with a second guide wheel disposed directly behind the first guide wheel and subjecting the second guide wheel directly to the hot flue-gas flow.

In accordance with yet another additional feature of the invention, there is the step of providing a single compressor and forming the hot flue-gas flow and the cooling-gas flow from air compressed in the single compressor.

In accordance with an added feature of the invention, there is the step of providing the single compressor as a turbo-compressor.

In accordance with another feature of the invention, there is the step of driving the single compressor with the turbine.

With the foregoing and other objects in view there is provided, in accordance with the invention, a gas turbine system, including: a turbine for receiving and expanding a hot flue-gas flow; at least one structural component disposed in the turbine, the at least one structural component having a cooling-passage for receiving a cooling-gas flow, the cooling-gas flowing through the cooling-passage and into the hot flue-gas flow causing a temperature drop in the hot flue-gas flow; a metering device receiving and metering fuel to the hot flue-gas flow, the fuel combusting in the hot flue-gas flow to compensate for the temperature drop; and a control device for controlling a metered addition of a quantity of the fuel.

In accordance with an added feature of the invention, the cooling passage is one of a plurality of cooling passages, the guide wheel has a multiplicity of guide blades and each of the guide blades has one of the cooling passages for receiving a portion of the cooling-gas flow.

In accordance with an added feature of the invention, there is a compressor connected to the turbine, a combustion device connected between the turbine and the compressor, the combustion device receiving a gas flow from the compressor and outputting the flue-gas flow, and a cooling-line system interconnecting the compressor and the turbine for providing the cooling-gas flow.

In accordance with another feature of the invention, the compressor is mechanically coupled to the turbine.

In accordance with another feature of the invention, there is a mixer disposed in the cooling-line system and connected to the metering device for admixing the fuel with the cooling-gas flow.

In accordance with a concomitant feature of the invention, there is a cooler disposed in the cooling-line system between the compressor and the mixer.

With regard to the gas turbine system, the object is achieved by a turbine for expanding a hot flue-gas flow, having at least one structural component which has a cooling passage for conducting a cooling-gas flow flowing through it. The cooling-gas flow is then fed to the hot flue-gas flow. A fuel is metered into the hot flue-gas flow by a metering device. The metering device is regulated by a control device by which a temperature drop in the flue-gas flow, which temperature drop results from the feeding of the cooling-gas flow without a metered addition of fuel, is largely compensated for by the combustion of the fuel added in a metered fashion. Here, to be largely compensated for means that, on average per unit of time and/or spatially, the heat quantity supplied by the combustion corresponds approximately to cooling of the flue-gas flow by supplying the cooling air. In other words, it could be said that the temperature of the cooling air is raised to the respectively prevailing temperature of the flue-gas flow. Of course, on account of the complexity of the thermodynamic processes, the formulation also largely includes a slight overcompensation or undercompensation.

The invention starts out from the fact that a conventional gas turbine in which air is used for the cooling may be understood as a thermodynamic machine in which two separate working media pass through two different categories of cyclic processes. A first category relates to the actual hot-gas process described above. A second category relates to the cooling-gas processes. The working medium of the hot-gas process in the gas turbine is the hot flue gas which flows to the turbine. Gas flows which are admixed with the flue gas behind the inlet of the turbine are disregarded, thus the cooling-gas flows in particular, which are admixed with the flue-gas flow in a conventional manner from the cooled structural components of the turbine after the cooling task is performed in each case, are disregarded. Working media of the cooling-gas processes are the gases, in particular air, which is used to cool the structural components of the turbine. Appropriate air is extracted in a conventional manner at the outlet or at a bleed point from a compressor allocated to the turbine and, possibly after special cooling, is fed to the turbine structural components to be cooled, in particular the guide and moving blades. The cooling gas ultimately passes from the latter into the flue-gas flow and is distributed therein. The phenomenon of the distribution may be disregarded for simple consideration in terms of a model. Within these limits, the hot-gas process and the cooling gas processes may be considered independently of one another. During both the hot-gas process and a cooling-gas process the same changes of state of the respective working medium will take place in principle. First, the working medium is compressed from the atmospheric pressure up to a predetermined maximum pressure. Heat is then supplied, the pressure of the working medium remaining unchanged except for virtually unavoidable pressure losses. Next, the working medium is expanded in the turbine until the working medium has reached a pressure corresponding to the ambient pressure. Finally excess heat is dissipated from the working medium until it has reached the ambient temperature. The last-mentioned change of state takes place outside the actual gas turbine and is a characteristic of the open cycle.

The hot-gas process and the cooling-gas process differ primarily by the temperature difference realized during the heating of the respective working medium. During the hot-gas process a temperature difference of over 500° C., possibly even over 1000° C. occurs. During the cooling-gas process a temperature difference of at most 200° C. occurs. Accordingly, the efficiencies of the processes and the contributions which the processes make to the mechanical work produced overall by the gas turbine differ. A considerable portion of the mechanical work performed overall by the turbine has to be applied in order to compress the working medium or, within the limits of the consideration just made, the working media. The "useful work" freely available from a thermodynamic process is the difference between the "expansion work" performed by the turbine and the "compression work" required for the compression. The useful work is all the greater, the greater the temperature difference of the expansion at a given temperature difference of the compression, predetermined by the compressor used in each case. The result of this is that the cooling-gas process can, at best, only make a very small contribution to the useful work.

Thermodynamic losses which result in an actual gas turbine during both the compression and the expansion processes require a change in the consideration just made to the effect that an increased temperature gradient has to be taken as a basis during the compression and a reduced temperature gradient has to be taken as a basis during the expansion. This results in a further reduction in the useful work to be expected from a cooling-air process, and the possibility has to be considered that the useful work of a cooling-gas will become negative. A cooling-gas process may possibly absorb more work than it performs. Since a modern gas turbine requires 20% to 25% of the total compressed air available to be diverted as cooling air, the losses which have to be tolerated with regard to the useful work are quite significant. Nonetheless, it must be assumed that at most 80% of the total air available can contribute to the single hot-gas process, which essentially determines in its own the useful work delivered by the gas turbine.

The invention starts out from the idea that admixing cooling air (or another cooling gas) with the expanding flue gas in a turbine would be harmless thermodynamically if the admixed cooling air (or the admixed cooling gas) had the same temperature as the hot gas. It goes without saying that there will still be a certain loss if the cooling gas is subjected to special treatments, for example cooling, or if the cooling gas has to be brought by use of additional blowers to a higher pressure than the flue gas. This may be necessary in order to ensure a required cooling effect or to compensate for any choke points in a cooling-passage system through which the cooling-gas flow has to be passed. Such losses must admittedly be disregarded in this case. The losses and the possible minimizing of them may require additional considerations.

Since, as stated, cooling gas in the turbine structural components to be cooled is usually heated up by at most 200° C. and thus only reaches a temperature of perhaps up to 700° C., additional heating of the cooling gas must therefore take place.

Within the scope of the invention, the heating is only realized, and only to the desired level, after the cooling gas has preformed its cooling task, namely when the cooling gas has passed out of the structural components to be cooled into the flue gas. In this case, the invention utilizes the fact that a fuel, for example natural gas, at the temperatures prevailing in a hot flue gas at least when the latter is located in the first stages of the turbine, ignites very quickly and without producing a flame and essentially burns completely. The conditions in the hot flue-gas flow are quite different from the conditions in a combustion device of a gas turbine. A combustion device is subjected to flow at temperatures of at most 500° C. Therefore flame formation is necessary for the combustion of any fuel in the combustion device. In the first stages of a turbine, a temperature of 1000° C. or above prevails. Therefore a spontaneously exothermic reaction between oxygen present and separately fed fuel can always be expected there, unlike in a conventional combustion device. It may be noted that oxygen is always present in a flue-gas flow in a conventional gas turbine. A combustion process in a combustion device of a conventional gas turbine always runs under an excess of oxygen, and the conventional cooling with air adds more oxygen. There is therefore always sufficient oxygen for the combustion of fuel to the extent required.

Furthermore, the invention has still further advantages. By the additional combustion of fuel, the output of the turbine is increased without the temperature of the flue gas having to be increased at the inlet to the turbine. If the configuration of the turbine is the same and if the selection of materials used to construct it remains the same, the useful work delivered by a gas turbine to which the turbine belongs is therefore clearly increased. In addition, further cooling of the flue-gas flow beyond the temperature drop predetermined by the expansion is avoided. This improves the thermodynamic efficiency of the turbine. By the additional combustion of fuel, essentially that state which would prevail without the provision of the cooling-gas flow is produced in the turbine, apart from additional energy losses in the line system through which the cooling-gas flow has to flow. It is therefore more or less immaterial which quantity of cooling gas is provided for the structural components to be cooled. The cooling-passage systems in the corresponding structural components of the turbine may therefore possibly be simplified and the production costs of these structural components clearly reduced. However, the invention can also be combined with modern cooling systems achieving a pronounced cooling effect with comparatively small cooling-air quantities. In such a combination additional thermodynamic losses which result in connection with the necessary preparation of the cooling air are in any case kept at the lowest level. Finally, the combustion of fuel in the turbine can replace interheating of the flue-gas flow. Interheating is realized by a turbine being constructed in two parts and by the flue-gas flow between the two parts of the turbine being reheated by combustion of fuel fed accordingly. The principle corresponds to the frequently applied principle of reheating in a steam-turbine plant.

Within the scope of a preferred further development, the fuel is admixed with the cooling-gas flow before the latter is fed to the flue-gas flow. The corresponding turbine correspondingly has in the cooling-line system a mixer for admixing fuel with the cooling-gas flow flowing through the mixer. Furthermore, the admixing of the fuel is effected preferably before the fuel flows through the structural component and in addition the fuel is preferably mixed homogeneously into the cooling-gas flow. This is of importance, because a homogeneous distribution of the fuel in the cooling-gas flow reduces the ignitability of the resulting mixture to the greatest extent.

In the case in which the cooling-gas flow consists essentially of air, the fuel is preferably admixed with the cooling-gas flow in a percentage by weight of at most 2%. At this mixture ratio, unintentional ignition of the mixture of air and fuel is essentially impossible, in particular when the fuel is mixed homogeneously into the cooling-gas flow. The same purpose is served and the corresponding advantage increased by the cooling-gas flow being cooled before admixing the fuel, for which purpose the cooling-line system of the turbine between the compressor and the mixer would have to be provided with a corresponding cooler for cooling the cooling-gas flow. Such cooling is of particular importance when the compressed air from which the flue-gas flow is formed is compressed to more than about 20 times the ambient pressure and a temperature level of around 500° C. is achieved.

The cooled structural component of the turbine is preferably a guide wheel, in particular a first guide wheel, which is subjected directly to the flue-gas flow at the inlet to the turbine, or a second guide wheel disposed directly behind such a first guide wheel. The cooling-air quantity fed to the first guide wheel is preferably about 5% to 15%, in particular 10%, of the total air quantity flowing through the compressor. Accordingly, the stages of the turbine which lie in the region of the turbine inlet are in particular taken into consideration for the use of the invention. At these turbine stages, the temperature level in the flue gas is especially high, and thus the advantage achievable by the special heating of the cooling air to a temperature level of the flue-gas flow is greatest. Since guide wheels are static structural components in the turbine, a transition from a static to a rotating passage, as would be necessary, for example, to deliver cooling air to structural components of a rotor of the turbine, is also dispensed with in the feeding of the cooling gas to these structural components. Furthermore, the cooling of rotating components of the turbine may be effected with air without fuel added in a metered fashion. The addition of fuel for the purpose of compensating for a temperature drop otherwise occurring may be effected solely via static structural components.

The method or the configuration of the turbine is also preferably used to the effect that the flue-gas flow and the cooling-gas flow are formed from air which is compressed in a single compressor, in particular a turbo-compressor. In this case, the compressor is driven in particular by the turbine, that is, it is combined with the turbine and a combustion device (not described in more detail here) to form a gas turbine in accordance with conventional practice.

Other features which are considered as characteristic for the invention are set forth in the appended claims.

Although the invention is illustrated and described herein as embodied in a method of expanding a flue-gas flow in a turbine, and a corresponding turbine, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

Figure 1:
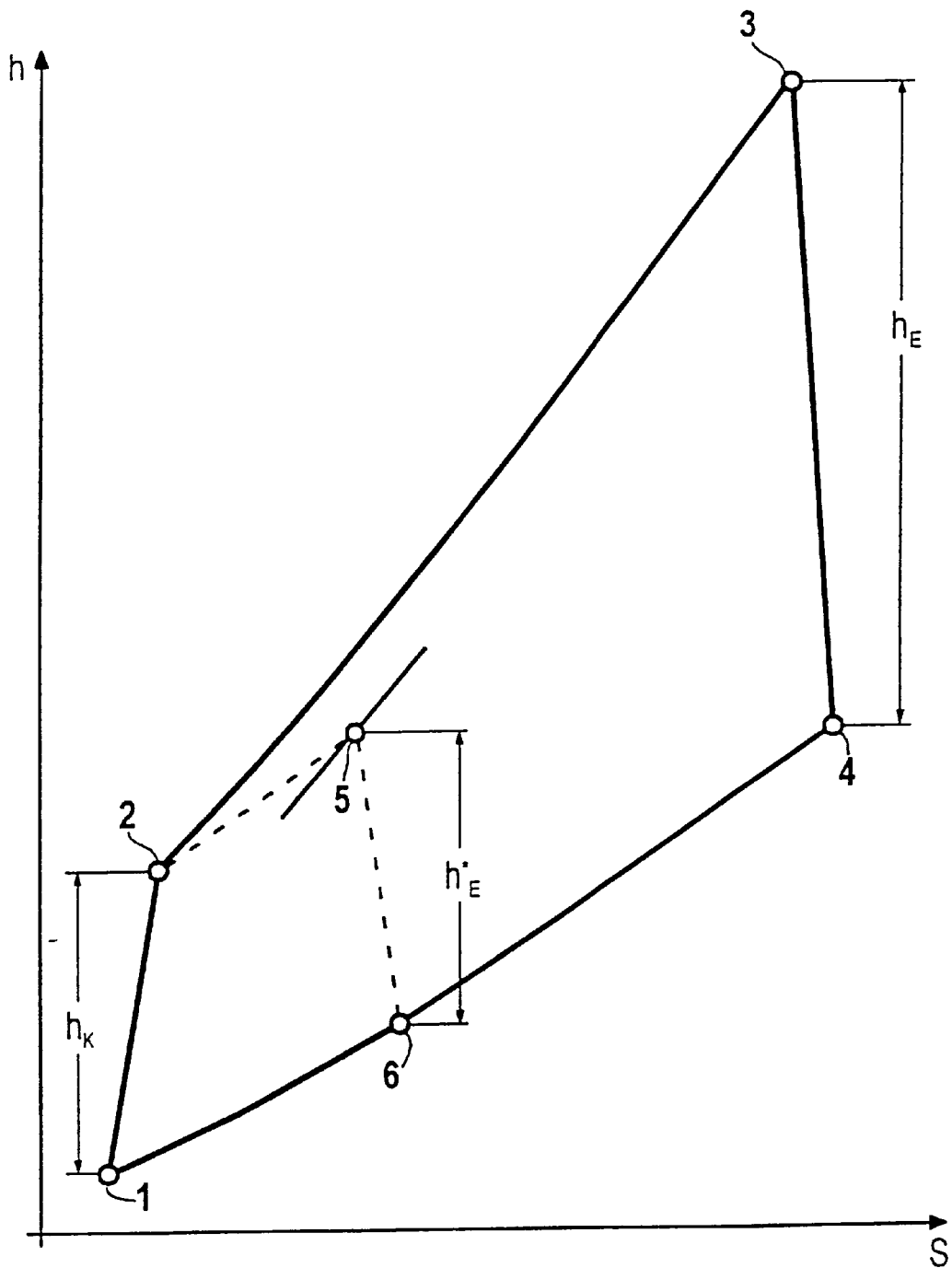
FIG. 1 is a graph showing an entropy-enthalpy diagram for explaining a hot-gas process and a cooling-gas process.

DESCRIPTION OF THE PREFERRED EMBODIMENTS:

Referring now to the figures of the drawing in detail and first, particularly, to FIG. 1 thereof, there is shown a hot-gas process and a cooling-gas process, as it takes place in a gas turbine, plotted in a diagram representing an enthalpy h against an entropy S of a working medium. Enthalpy h and entropy S are thermodynamic state variables which are used in a conventional manner to describe a thermodynamic process in a turbo-machine. Here, the enthalpy is a variable which is closely correlated with a temperature of the working medium. On condition that a pressure of the working medium remains constant, the enthalpy indicates its heat content. The entropy is another thermodynamic state variable, which, inter alia, determines which proportion of the overall energy available in a thermodynamic system, in particular in the working medium considered here, can be extracted in the form of mechanical energy. The entropy as a thermodynamic state variable is characterized in particular in that it remains constant during an adiabatic compression or expansion of a working medium.

A hot-gas process, which mainly delivers the energy produced by a gas turbine, is represented by those lines which connect points 1, 2, 3 and 4 to one another. Point 1 indicates the thermodynamic state of the working medium, that is air, under the normal ambient conditions with regard to pressure and temperature. The line between points 1 and 2 symbolizes the compression of the working medium in the compressor, the entropy of the working medium changing only slightly; the changes correspond to irreversible processes and thus to losses. The line between points 2 and 3 symbolizes the heating of the working medium at a largely constant pressure after the compression is completed. Of course, the heating of the working medium, which usually takes place in the form of combustion, implies a change in its chemical composition. However, the change has no substantial effect on the thermodynamics. The flue-gas flow to be expanded is present at point 3. The largely adiabatic expansion of the flue-gas flow in the turbine is effected between points 3 and 4, and finally the line between points 4 and 1 corresponds to a cooling-down of the working medium to the ambient temperature, which working medium is already expanded to the ambient pressure. In the case of the gas turbine, this is realized by the heated working medium being distributed in the ambience, which is to be regarded as a thermodynamic plenum. The mechanical work which is performed by the hot-gas process is determined by the difference between the expansion enthalpy $h_E$ reduced during the expansion and the compression enthalpy $h_K$ built up during the compression. A cooling-gas process is likewise shown in FIG. 1. The cooling-gas process runs between points 1, 2, 5 and 6. Point 5 lies below the line connecting points 2 and 3. This can be explained by the fact that the cooling gas is only fed to the flue-gas flow once the latter is already at reduced pressure. It can clearly be recognized that the expansion enthalpy $h_E^*$ is clearly less than the expansion enthalpy $h_E$ of the hot-gas process so that the cooling-gas process can scarcely contribute to the useful work actually produced.

The invention is distinguished in particular by the fact that point 5 is displaced upwards to the right on a line of constant pressure and approaches point 3. In this way, the expansion enthalpy $h_E^*$ of the cooling-gas process can be increased significantly so that the latter can also perform a considerable amount of useful work. How this can be brought about will now be explained with reference to FIGS. 2, 3 and 4.

Figure 2:
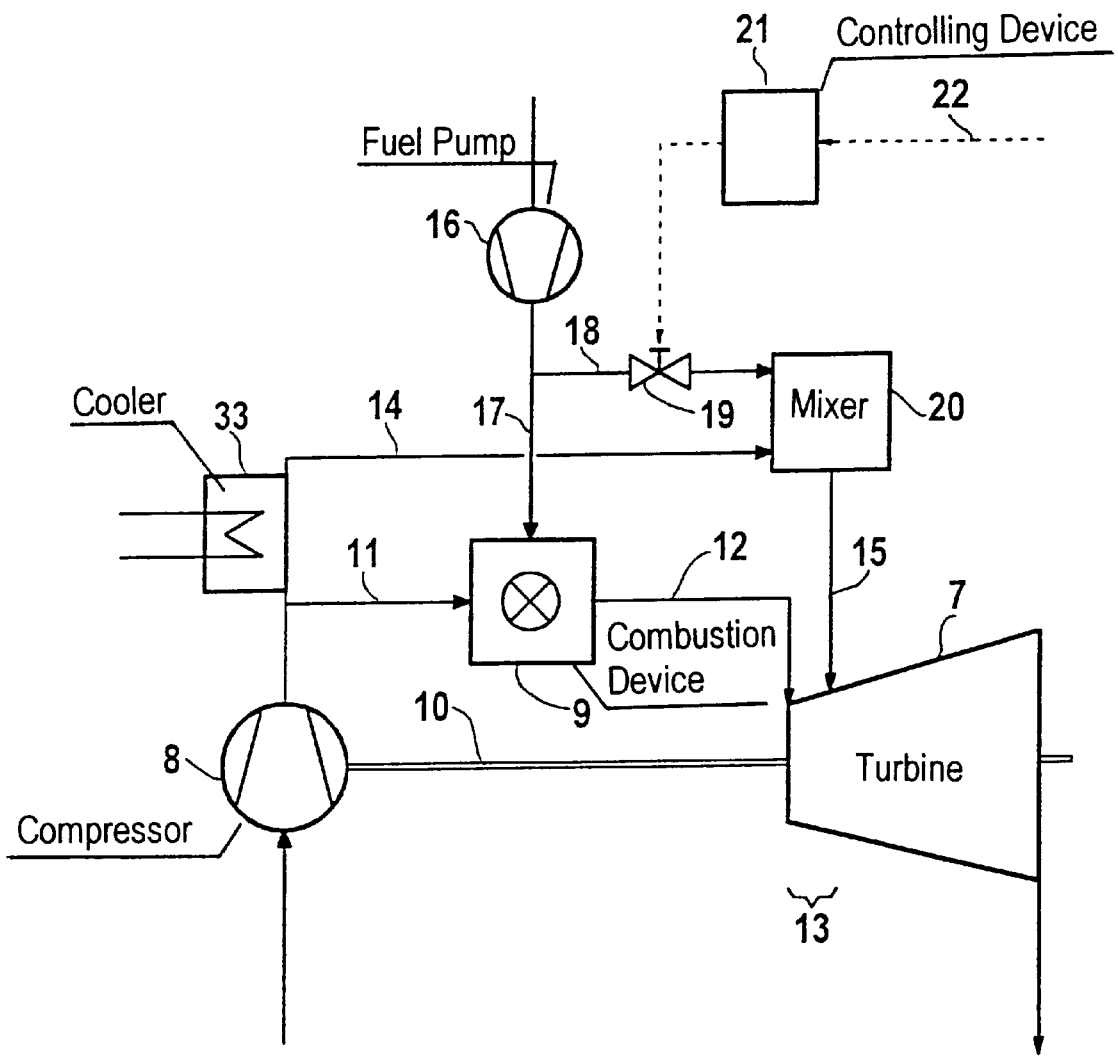
FIG. 2 is a block diagram of a gas turbine in accordance with the invention.
Figure 3:
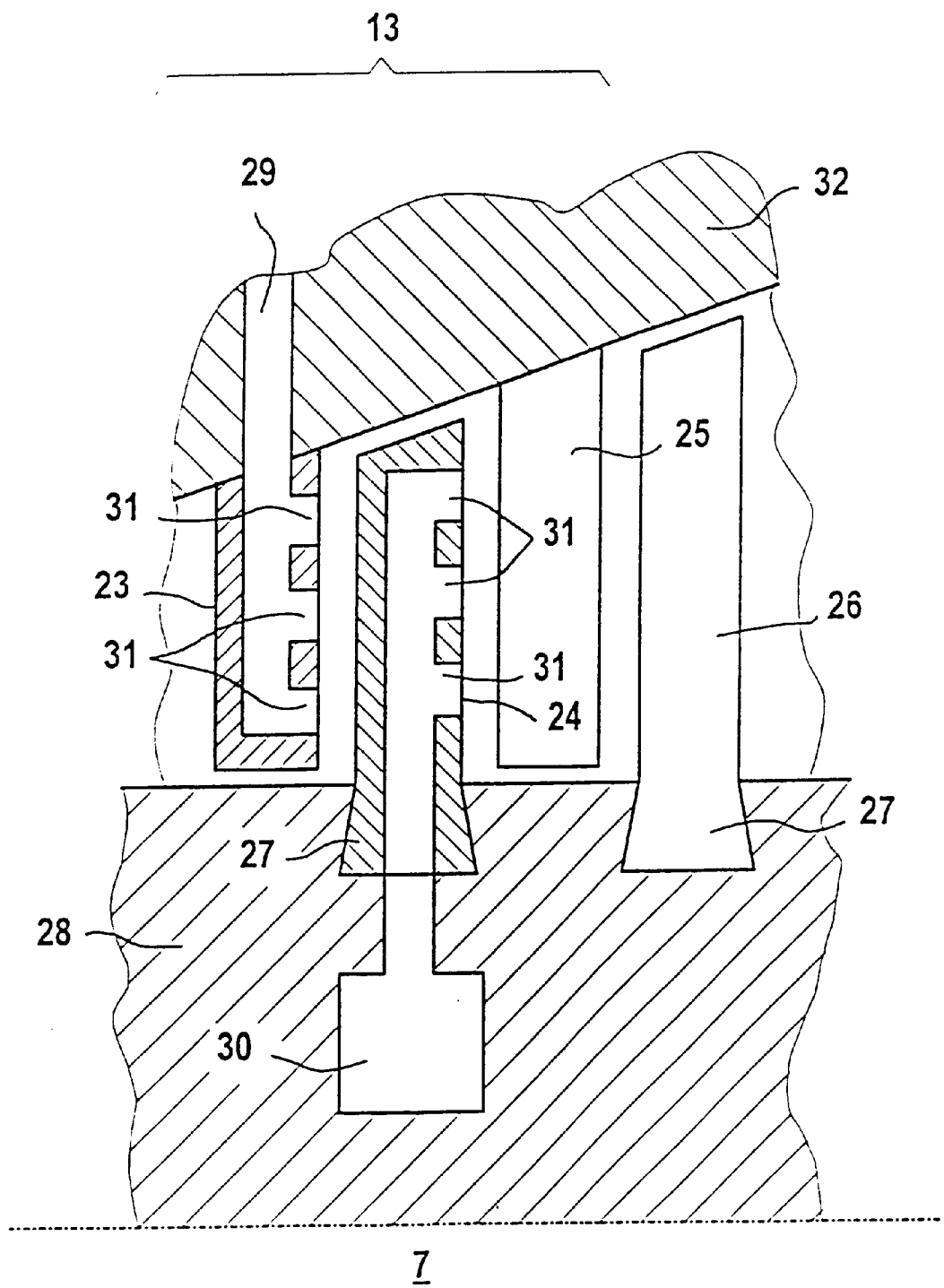
FIG. 3 is an axial longitudinal-sectional view through the gas turbine.
Figure 4:
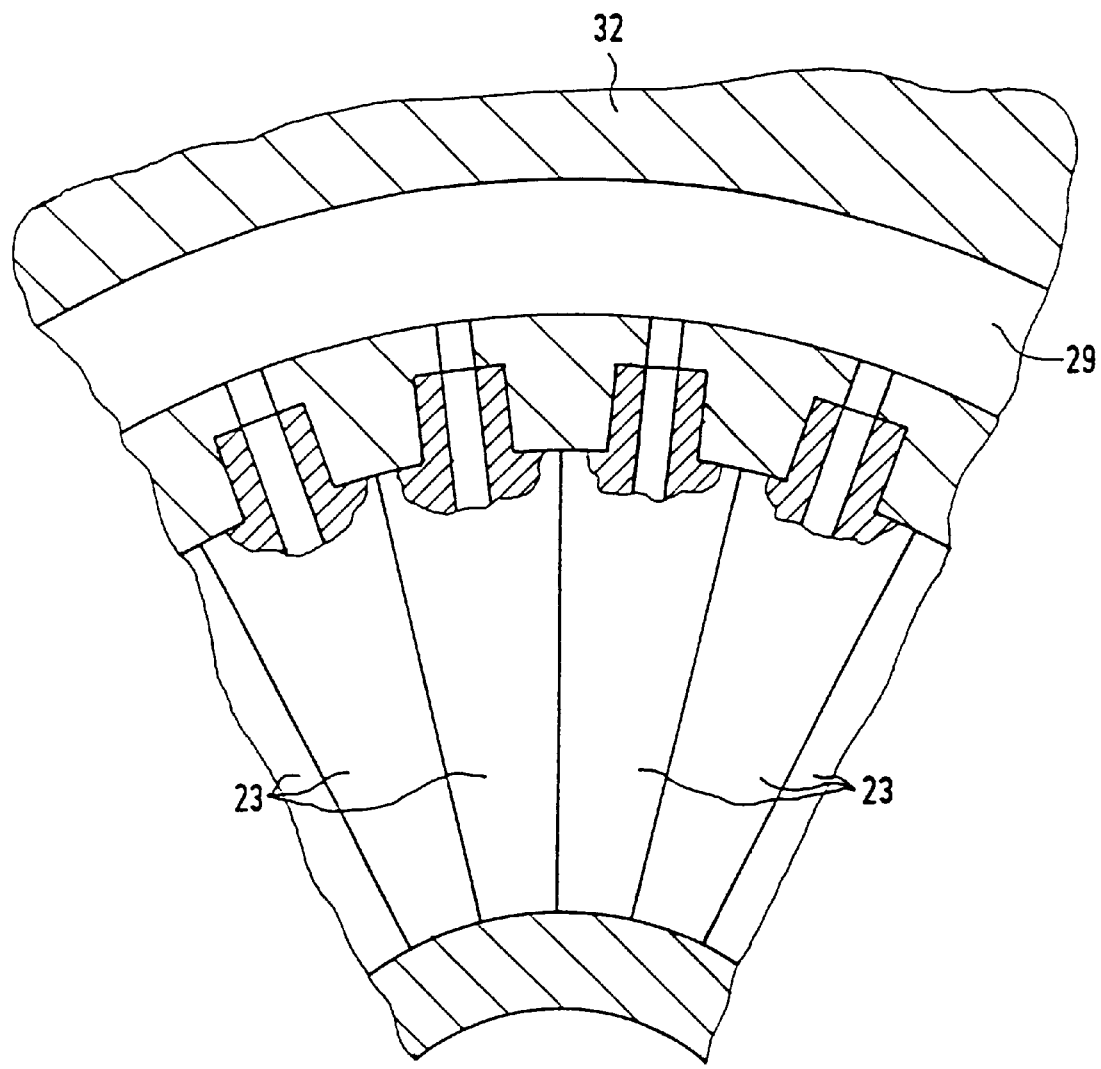
FIG. 4 is an axial cross-sectional view through a first guide wheel of the gas turbine.

FIG. 2 may be considered as both a diagrammatic representation of the gas turbine and a diagrammatic representation of the thermodynamic process taking place in the gas turbine. FIGS. 3 and 4 are intended to illustrate certain configuration details which may be of importance in the gas turbine according to FIG. 2.

FIG. 2 shows a turbine 7 which is combined with a compressor 8, in particular a turbo-compressor, and a combustion device 9 to form a gas turbine in which a thermodynamic process, including a hot-gas process and at least one cooling-gas process of the type explained with reference to FIG. 1. The turbine 7 drives the compressor 8 via a turbine shaft 10. The compressor 8 provides an intake flow of compressed air, which passes via an intake-air line 11 to the combustion device 9, where it is heated and transformed into a flue-gas flow which passes through a flue-gas line 12 to the turbine 7. It flows there to an inflow region 13 in order to be finally released again into the ambience after complete expansion.

With regard to the explanation of the method, the intake-air line 11 and the flue-gas line 12 may be considered to be synonymous with the intake-air flow 11 and respectively the flue-gas flow 12 which they conduct in each case. Likewise, the cooling lines 14 and 15 to be explained below may be understood as the apparatus counterparts of the cooling-gas flows 14 and 15 respectively which they conduct. Finally the same applies to the fuel line 17 and respectively the branch 18 and the fuel which they conduct in each case.

Since the flue-gas flow 12 is very hot, a process for cooling the turbine 7 or its correspondingly loaded structural components must be provided. For this purpose, air is bled from the intake-air flow 11 via a first cooling line 14, which air does not pass to the combustion device 9 but is fed as a cooling-gas flow more or less directly, in this case via a second cooling line 15, to the turbine 7. In order to improve the cooling-gas process through which the cooling-gas flow 14, 15 passes, a portion of the fuel fed to the combustion device 9 via a fuel pump 16 and a fuel line 17 is diverted via a branch 18 and a control valve 19, which portion passes to a mixer 20 and is mixed there with the cooling air delivered by the first cooling line 14. The cooling-gas flow thus obtained, to which fuel is added, passes through the second cooling line 15 to the turbine 7. That is, it is added in a metered fashion to the flue-gas flow 12, where it burns releasing additional heat energy. The desired additional heating of the cooling-gas flow 14, 15 is thereby realized.

It is of great importance that the control valve 19 is set or controlled for the purpose indicated, for which a controlling device 21 is provided which controls the control valve 19 in accordance with a preset parameter 22. The preset parameter 22 may be a value determined by calculation or empirically and may correspond to a desired fuel concentration in the cooling-gas flow. It is of course also possible to include the controlling device 21 in a control loop which analyses information from a suitably disposed sensor, for example a temperature sensor in the turbine 7, and accordingly delivers the preset parameter 22. The combination of the control valve 19 and the controlling device 21 forms a metering unit 19, 21 for the fuel 18 to be added in a metered fashion to the flue-gas flow 12. In order to cool the cooling-gas flow 14, 15 for improving the cooling effect in the turbine 7 and for reducing the probability of premature ignition of the fuel 18 added in a metered fashion, a cooler 33 is provided in the first cooling line 14.

FIG. 3 shows a partial view of an axial longitudinal section through the turbine 7, including the inflow region 13 into which the flue-gas flow 12 to be expanded initially passes. The flue-gas flow 12 flows through the turbine 7 from left to right. It passes first of all to a first guide blade 23, which together with a multiplicity of identical guide blades forms a first annular guide wheel. The first guide wheel 23 is shown in detail in the cross-sectional view shown in FIG. 4. According to FIG. 3, the flue-gas flow passes behind the first guide wheel 23 to a first rotor wheel 24, formed from a multiplicity of first moving blades 24, which unlike the first guide blades 23 rotate during operation of the turbine 7. A second guide wheel 25 having second guide blades as well as a second rotor wheel 26 having second moving blades are disposed behind the first rotor wheel 24. Each guide wheel 23 or 25 forms a turbine stage with the directly following rotor wheel 24 or 26. A conventional gas turbine has in particular four turbine stages, in which case at least the turbine stages lying in the inflow region 13 can be cooled as a rule.

The moving blades 24 and 26 are anchored with associated blade roots 27 in a rotatable turbine rotor 28. The blade roots 27 must absorb in particular the considerable centrifugal forces to which the moving blades 24 and 26 are subjected during operation.

The first guide blade 23 is cooled by a portion of the cooling-gas flow being fed to it through an internal cooling passage 29. An internal cooling passage 30 is provided for cooling the first moving blade 24. From the cooling passages 29 and 30, the cooling-gas flow passes through cooling-gas openings 31 into the flue-gas flow 12.

The cooling-gas flow 15 to which fuel is added can readily be fed to the cooling passage 29, since the latter merely has to be passed through a fixed turbine casing 32 of the turbine 7. Since the cooling passage 30 ultimately has to pass through the turbine rotor 28 rotating during operation, a cooling-gas flow 14 without fuel is expediently fed to it. This avoids having to direct fuel through a transition part between a fixed and a rotating turbine component. In practice, however, this results in hardly any restriction, since it is probably sufficient in most cases to direct the fuel solely through cooling passages like the cooling passage 29.

FIG. 4 shows a cross-sectional view through the first guide wheel 23, formed by the first guide blades 23. Therefore reference may be made mainly to FIG. 3 in order to explain FIG. 4. To complement FIG. 3, FIG. 4 also shows a way of fastening the first guide blades 23 in the turbine casing 32 as well as details of the cooling passage 29.

The invention described here is distinguished in particular by the fact that certain disadvantages which have to be tolerated in conventional gas turbines on account of the need to cool certain structural components are removed. This is effected essentially in that the cooling-gas processes which have to take place within the course of such cooling are adapted to the hot-gas processes which perform the useful work delivered by the gas turbine.

I claim:

1. A gas expansion method, which comprises:

providing a hot flue-gas flow through a turbine;

cooling at least one structural component of the turbine by a cooling-gas flow flowing through the at least one structural component;

feeding the cooling-gas flow from the at least one structural component into the hot flue-gas flow; and metering fuel into the cooling gas flow in the turbine and combusting the fuel with the cooling gas flow and raising a temperature of the cooling-gas flow exiting the structural component substantially to a temperature of the hot flue-gas flow prevailing at the structural component.

2. The method according to claim 1, which comprises admixing the fuel with the cooling-gas flow before the cooling-gas flow is fed into the hot flue-gas flow.

3. The method according to claim 2, which comprises admixing the fuel with the cooling-gas flow before the cooling-gas flow passes through the at least one structural component.

4. The method according to claim 2, which comprises mixing the fuel homogeneously into the cooling-gas flow.

5. The method according to claim 2, which comprises providing the cooling-gas flow to consist essentially of air and admixing the fuel with the cooling-gas flow in a percentage by weight of at most 2%.

6. The method according to claim 5, which comprises cooling the cooling-gas flow before admixing the fuel.

7. The method according to claim 1, which comprises providing the at least one structural component of the turbine as a guide wheel, and subjecting the guide wheel directly to the hot flue-gas flow at an inlet of the turbine.

8. The method according to claim 7, which comprises providing the guide wheel as a first guide wheel.

9. The method according to claim 8, which comprises providing the turbine with a second guide wheel disposed adjacent the first guide wheel and subjecting the second guide wheel directly to the hot flue-gas flow.

10. The method according to claim 1, which comprises providing a single compressor and forming the hot flue-gas flow and the cooling-gas flow from air compressed in the single compressor.

11. The method according to claim 10, which comprises providing the single compressor as a turbo-compressor.

12. The method according to claim 10, which comprises driving the single compressor with the turbine.

13. A gas turbine system, comprising:

a turbine for receiving and expanding a hot flue-gas flow;

at least one structural component disposed in said turbine, said at least one structural component having a cooling-passage for receiving a cooling-gas flow, the cooling-gas flowing through said cooling-passage and into the hot flue-gas flow;

a metering device receiving and metering fuel to the cooling gas flow, the fuel combusting with the cooling gas and raising a temperature of the cooling gas; and a control device connected to said metering device for controlling a quantity of the fuel metered by said metering device, said control device adjusting the quantity of fuel to raise the temperature of the cooling gas substantially to a temperature prevailing at said structural component.

14. The gas turbine system according to claim 13, wherein said turbine has an inlet and said at least one structural component is a guide wheel, said guide wheel is subjected directly to the hot flue-gas flow at said inlet of said turbine.

15. The gas turbine system according to claim 14, wherein said guide wheel is a first guide wheel.

16. The gas turbine system according to claim 15, wherein said turbine has a second guide wheel disposed adjacent said first guide wheel, and said second guide wheel is subjected directly to the hot flue-gas flow.

17. The gas turbine system according to claim 14, wherein said cooling passage is one of a plurality of cooling passages, said guide wheel has a multiplicity of guide blades and each of said guide blades has one of said cooling passages for receiving a portion of the cooling-gas flow.

18. The gas turbine system according to claim 13, including a compressor connected to said turbine, a combustion device connected between said turbine and said compressor, said combustion device receiving a gas flow from said compressor and outputting the hot flue-gas flow, and a cooling-line system interconnecting said compressor and said turbine for providing the cooling-gas flow.

19. The gas turbine system according to claim 18, wherein said compressor is a turbo-compressor.

20. The gas turbine system according to claim 18, wherein said compressor is mechanically coupled to said turbine.

21. The gas turbine system according to claim 18, including a mixer disposed in said cooling-line system and connected to said metering device for admixing the fuel with the cooling-gas flow.

22. The gas turbine system according to claim 21, including a cooler disposed in said cooling-line system between said compressor and said mixer.

* * * * *